United States Patent
Bevis et al.

(10) Patent No.: US 6,770,868 B1
(45) Date of Patent: Aug. 3, 2004

(54) CRITICAL DIMENSION SCANNING ELECTRON MICROSCOPE

(75) Inventors: Christopher F. Bevis, Los Gatos, CA (US); David E. Clapper, Livermore, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 0 days.

(21) Appl. No.: 10/440,826

(22) Filed: May 19, 2003

(51) Int. Cl.[7] ................................................ H01J 49/00
(52) U.S. Cl. ................................. 250/252.1; 250/310
(58) Field of Search ............................. 250/252.1, 310

(56) References Cited

U.S. PATENT DOCUMENTS 6,384,408 B1 * 5/2002 Yee et al. ................. 250/252.1

* cited by examiner

Primary Examiner—Kiet T. Nguyen
(74) Attorney, Agent, or Firm—Luedeka, Neely & Graham, P.C.

(57) ABSTRACT

A system for determining an actual measurement of a structure on a sample using a measurement tool with a calibration standard having measurement sites. A previously measured site on the calibration standard with a first known metric is measured with the measurement tool to produce a first measurement. A newly measured site on the calibration standard, also with a second known metric is measured with the measurement tool to produce a second measurement. A calibration factor for the measurement tool is computed by comparing the first measurement to the first known metric and the second measurement to the second known metric. The structure on the sample is then measured using the measurement tool to produce a precursor measurement. This precursor measurement is adjusted with the calibration factor to produce an intermediate measurement. Then the intermediate measurement is adjusted with the sample composition data to produce the actual measurement.

23 Claims, 3 Drawing Sheets

|   |   | Measurement Number |   |   |   |
|---|---|---|---|---|---|
| 1 | 2 | 3 | 4 | 5 | 6 |
| Site 1 |  |  |  |  |  |
| Site 2 |  |  |  |  |  |
| Site 3 | Site 3 |  |  |  |  |
| Site 4 | Site 4 |  |  |  |  |
| Site 5 | Site 5 | Site 5 |  |  |  |
| Site 6 | Site 6 | Site 6 |  |  |  |
|  | Site 7 | Site 7 | Site 7 |  |  |
|  | Site 8 | Site 8 | Site 8 |  |  |
|  |  | Site 9 | Site 9 | Site 9 |  |
|  |  | Site 10 | Site 10 | Site 10 |  |
|  |  |  | Site 11 | Site 11 | Site 11 |
|  |  |  | Site 12 | Site 12 | Site 12 |
|  |  |  |  | Site 13 | Site 13 |
|  |  |  |  | Site 14 | Site 14 |
|  |  |  |  |  | Site 15 |
|  |  |  |  |  | Site 16 |

Fig. 3

CRITICAL DIMENSION SCANNING ELECTRON MICROSCOPE

FIELD

This invention relates to the field of instrumentation. More particularly, this invention relates to improved data output from an electron microscope.

BACKGROUND

In the integrated circuit industry, electron microscopes are central to microstructural analysis of integrated circuit components. The quality of the finished integrated circuit is highly dependent on the measurement and control of an integrated circuit's critical dimensions. Thus, it is very important to ensure that the critical dimension measurements received from the electron microscope are precise and accurate.

Typically, in critical dimension analysis of an integrated circuit component the electron microscope measures the apparent width of a structure when determining its dimensions. The apparent width of the structure is compared to critical dimension specifications in order to determine the compliance of the integrated circuit component.

Unfortunately, there seem to be disadvantages to using the typical apparatus and method, as the apparent width of a structure as reported by the measurement tool is often different from the actual width of the structure. In addition, the discrepancy between the actual width and the apparent width of the structure seems to fluctuate from sample to sample, and even from day to day. Thus, the integrity of the data derived from such measurements is often called into question, and is difficult to rely on.

In an effort to overcome this problem, some have used a calibration piece having a structure with a known size. The calibration piece is loaded into the measurement tool and measured at regular intervals, such as once each day. The difference between the apparent width and the actual width of the structure on the calibration piece is used as a correction factor for other measurements. Unfortunately, even this procedure tends to not have the desired accuracy in all situations.

Similarly, calibration pieces have been used that are optimized for viewing on an electron microscope, such as tin-on-gold resolution standards. These are used to verify the proper functioning of the electron microscope, and to measure the inherent resolution of the electron microscope. Unfortunately, because the interaction between the electron beam and the calibration piece is very different on such standards in comparison with the interaction between the electron beam and the semiconductor samples to be measured, the data produced is unfortunately of limited use in calibrating the scanning electron microscope for use as a measurement tool.

What is needed, therefore, is a system to improve the precision and accuracy of measurement data obtained from an electron microscope during critical dimension review of an integrated circuit component.

SUMMARY

The above and other needs are met by a system for determining an actual measurement of physical properties of a structure on a sample using a measurement tool with a calibration standard having measurement sites. A first site on the calibration standard with a first known metric is measured with the measurement tool to produce a first measurement. A calibration factor for the measurement tool is computed by comparing the first measurement to the first known metric. The structure on the sample is then measured using the measurement tool to produce a precursor measurement. This precursor measurement is adjusted with the calibration factor to produce an intermediate measurement. Then the intermediate measurement is adjusted with the sample composition data to produce the actual measurement.

Thus, rather than naively processing the scan data from the measurement tool to produce a measurement result, a model is preferably applied of both (1) how the electron optics perform, including their deviations from ideality, and (2) how the incident electrons interact with the structure on the sample to produce secondary and backscattered electrons. The properties of the electron optical system are preferably derived from both an analytical model of the optical system and from the measurement data taken on the calibration standard. The actual physical properties of the sample to be measured are then preferably determined using an analytical model of the interaction of the incident beam with the sample and the properties of the electron optical system as determined above. The physical properties are preferably determined by iteratively changing some of the sample parameters that are input to the sample interaction model, such as, but not limited to, feature width, height, sidewall angle, and degree of crystallinity, while other sample parameters are preferably kept constant, such as, but not limited to sample material, etc., to produce an analytically derived profile that most faithfully reproduces the empirically observed profile from the sample measurement. In this sense, the present system preferably goes beyond merely determining a correction factor to be applied to the measurement.

In this manner the system described herein provides improved measurement data by correcting the apparent width of a structure by both a calibration factor, which accounts for any drift in the properties of the measurement tool, and by sample structural and composition data, which accounts for measurement differences due to different materials and structures being measured. By calibrating the measurement tool in this manner, the precision and accuracy of the measurement tool is improved. The calibration standard is preferably of a similar composition of the structure to be measured, allowing for correct measurements of structures consisting of a wide range of materials.

Most preferably, the first site is a previously measured site. Preferably, a newly measured site on the calibration standard with a second known metric is also measured with the measurement tool to produce a second measurement. In this embodiment, the second measurement is also compared to the second known metric, and this information is also used in the computation of the calibration factor.

In various preferred embodiments, the measurement tool is preferably an electron microscope, and most preferably a scanning electron microscope.

Thus, rather than merely producing and using a single calibration factor, one or more properties of the electron optical system are preferably determined, which may include incident spot size, collection angles for secondary and backscattered electrons, depth of focus, etc. These properties are preferably used as the inputs to the optical system model used in the sample measurement. Determining these properties from the calibration sample measurement preferably involves the use of known properties of the sample, such as material or nominal feature dimensions, and the use of the sample interaction model described above.

One purpose of using multiple calibration sites is to preferably distinguish between variations in the calibration scan data, which variation can arise from three different sources, being: 1) variation in the measurement tool over time, 2) variation in the properties of one measurement site to another, and 3) variation due to modification of a single measurement site due to interaction with the measurement tool. The source of the variation is preferably determined by using the measurement results from a single calibration standard, as measured at multiple sites on the calibration standard, and the calibration data gathered from previous readings of calibration standards.

This information can be used to simultaneously determine, for example, that the width of a feature is systematically increased by one nanometer each time it is measured, that the size of the irradiated spot has decreased by a tenth of a nanometer since the last calibration, and that the two added measurement sites on the calibration standard deviate from the nominal size by 0.2 and –0.1 nanometers respectively. The determination of each of these example determinations is subject to some statistical uncertainty, which can be determined from the data.

The calibration factor is preferably computed by averaging the difference of the first measurement and the first known metric and the difference of the second measurement and the second known metric. The calibration standard is preferably replaced after each measured site has been measured a given number of times, the given number of times being the number of measurements before the measurement tool causes significant structural changes to the measured sites. The calibration standard preferably has over one hundred measurement sites. The composition data for the measured sites on the calibration standard is preferably substantially similar to the sample composition data. The composition data includes material information and structural information. The structural information is preferably automatically determined by imaging the structure. The material information is preferably automatically determined using material analysis techniques, and most preferably using dispersive x-ray analysis.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 3 is a chart depicting an example of a walking ladder scheme.

DETAILED DESCRIPTION

One aspect of this invention is that it has been advantageously determined that the accuracy of the apparent width of a sample is affected by many factors in addition to the actual width of the sample. For example, the interaction volume of the electrons in a given material and the related edge effects cause the apparent width of the sample to be much wider than its true physical dimensions. Similarly, the size of the measurement spot, the point spread function of the optical system, the extraction field being used, and the geometry of the collector all affect the measured feature width. Additionally, the apparent width of structures made with different materials tends to vary. Further, the properties of the measurement system may change over time, causing a given apparent width to drift, which again results in poor system precision.

Figure 1:
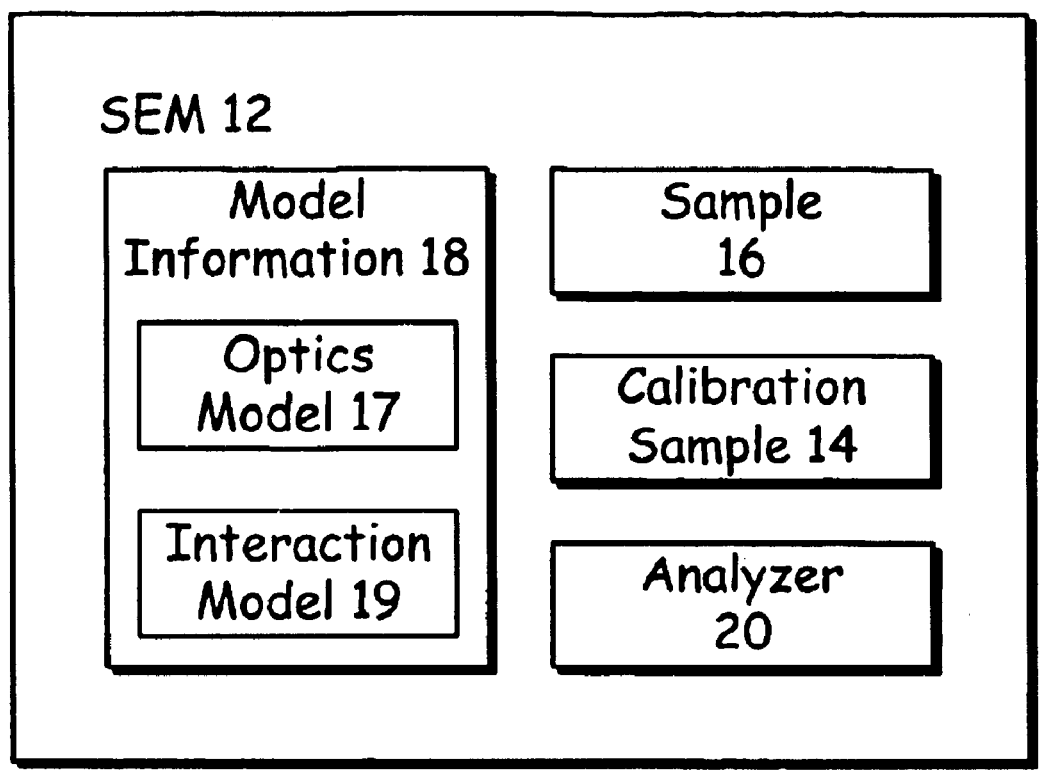
FIG. 1 is a functional block diagram showing a measurement tool for determining an actual measurement in critical dimension review according to a preferred embodiment of the invention.

FIG. 1 depicts a functional block diagram of a system 10 according to a preferred embodiment of the present invention. In the most preferred embodiment, the measurement tool is an electron microscope, such as a scanning electron microscope 12 of the type commonly used for critical dimension measurement in industries such as the integrated circuit fabrication industry. The electron microscope 12 is adapted to take measurements on a sample 16, such as a production sample, on which a measurement is to be taken for comparison to specification values. The system also preferably includes a calibration sample 14, model information 18, and an analyzer 20, all of which are described with greater particularity hereafter. It is appreciated that the elements 18 and 20 of the system 10 may be a part of the electron microscope 12, or may be separate elements that reside exterior to the electron microscope 12, such as on a computer that is connected to the electron microscope 12 such as by network connections.

The calibration sample 14 preferably includes a plurality of measurement sites on which measurements can be taken by the electron microscope 12. As it has been determined that taking repeated electron microscope readings on a measurement site can lead to degradation of the measurement site, each of the measurement sites on the calibration sample is preferably used only a given number of times, as described in more detail below. It is also preferred that the measurement sites on the calibration sample 14 be formed of the same or similar materials as the sample 16 to be measured by the SEM 12. Further, it is preferred that the general physical structure of the measurement sites on the calibration sample 14 also be either the same or similar to those on the sample 16 to be measured. By "similar" it is meant that the interaction between the measurement site on the calibration sample 14 and the electron beam of the SEM 12 behave in a substantially similar way as the interaction between the sample 16 to be measured and the electron beam of the SEM 12.

As it has also been determined that electron microscopes 12 tend to produce differing apparent widths based at least in part upon the constitution of a measurement sample, or in other words, based upon what the sample is made of and on the physical structure of the feature, at least some of the measurement sites on a given calibration sample 14 are preferably formed of the same material and structure, or of a similar material and structure, as that of the sample 16 which is to be measured. In this manner, errors that could otherwise be introduced as a result of the dissimilarity between the material and structure of the calibration sample 14 and the sample to measured 16 are avoided. Alternately, different calibration samples 14 could be used, where each of the measurement sites formed on a given calibration sample 14 are all formed of the same material. In this embodiment, a calibration sample 14 having measurement sites formed of the same material as the sample 16 to be measured is preferably used during the calibration procedure of the electron microscope 12.

Preferably, a new measurement site on the selected calibration sample 14 is measured and used as a part of the calibration procedure of the electron microscope 12. Most preferably, a new site is measured each time the calibration procedure is accomplished. In this manner, there is some assurance that at least with the newly used measurement site, there has been no aberration of the site due to electron bombardment by the electron microscope, and other forces. In alternate embodiments, a new measurement site is rotated in after a given number of calibration routines are performed. Preferably, a mixture of previously measured sites and newly measured sites are used for each calibration procedure, in order to determine the information described above.

The actual width and other structural properties of each of the measurement sites on the calibration sample 14 are preferably already known within some statistical uncertainty. Thus, a comparison of the apparent width of a given measurement site with the actual known width of the measurement site provides a calibration factor that can be applied to measurements of the sample 16 to provide at least an intermediate measurement value that is compensated for the current conditions of the electron microscope 12. By using such differential data collected from several measurement sites on the calibration sample 14, the calibration factor can be even more precise.

A walking ladder type of scheme is preferably used in conjunction with the measurement sites on the calibration sample 14. By this it is meant that a certain number of measurement sites are read for each calibration, and with succeeding calibration processes, that certain number includes a first number of measurement sites that are newly read, and excludes a second number, preferably the same as the first number, of measurement sites that were previously read, but are not to be read any more. Preferably, the total number of measurement sites read in a single calibration routine is between about two and about ten, and most preferably about six. The number of new measurement sites read for each calibration routine is preferably between about one and about five, and most preferably about two. The number of old measurement sites that are dropped in each succeeding calibration process is preferably between about one and about five, and most preferably about two. Thus, each measurement site is preferably read between a minimum of about one time and a maximum of about five times, and most preferably about three times, before it is retired. FIG. 3 provides an illustration of one embodiment of a walking ladder scheme.

As it has been determined that the particularities in regard to the sample 16 also effect the apparent width of the sample 16 as read by the electron microscope, there is preferably model information 18 that is also provided or generated as described below, which model information 18 is also used to determine at least the intermediate width value of the structure on the sample 16. Information in regard to many items can be included in this information, including the physical characteristics, such as the shape of the structure to be measured, the composition of the structure to be measured, or in other words, what it is made of, and also the composition of neighboring structures. Additionally, an indication of the approximate size of the structure may be beneficial. Model information 18 also preferably includes information such as an electron optics model 17 and a sample interaction model 19, both of which are described with more detail hereafter.

The model information 18, including the type of information described above, as well as the type of information described in more detail hereafter, and the comparison information in regard to the measurement sites on the calibration sample 14 are preferably analyzed by the analyzer 20, which uses the information to convert the apparent width measurement from the sample 16 into a corrected actual width measurement. A more detailed description of one method according to a preferred embodiment of the invention by which that is accomplished is given next.

Figure 2:
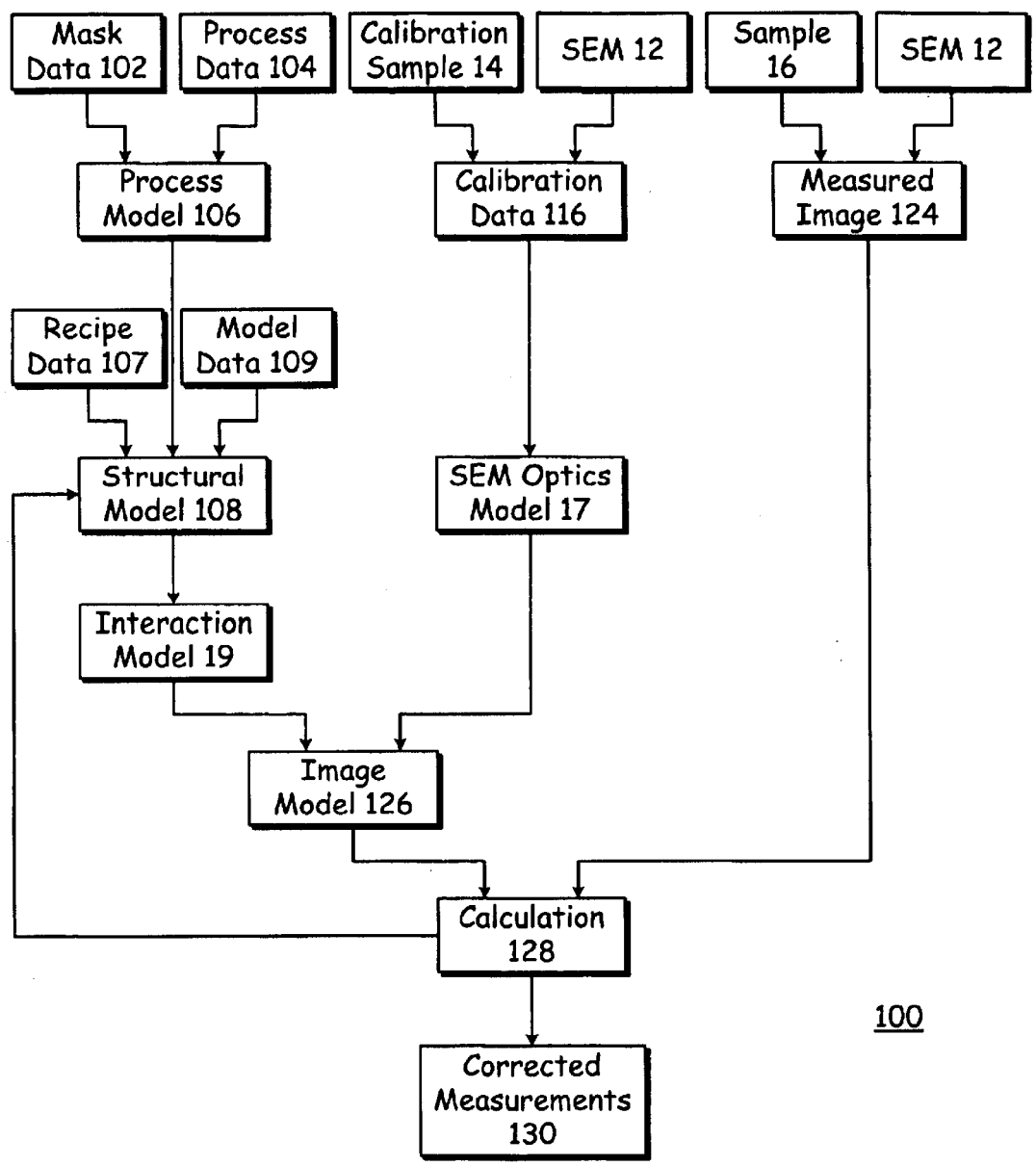
FIG. 2 is a flow chart showing a method for determining an actual measurement in critical dimension review according to a preferred embodiment of the invention.

With reference now to FIG. 2, there is depicted a flow chart of a method for correcting and converting an apparent width measurement into an actual width measurement, according to a preferred embodiment of a method according to the present invention. It is appreciated that the invention makes use of models based on information such as that described herein, but is not limited to the exact models or information described in this example.

Mask data 102 is preferably used as a part of the calibration. The mask data 102 represents information from the mask that is used to define the structure on the sample 16 that is to be measured. This information is beneficial because the actual width of the structure as defined on the mask is known with a high degree of precision and reliability. Also used is process data 104, such as information in regard to the deposition and etch processes whereby the structure was created and formed, the material of which the structure is formed, the lithographic process by which the structure was formed, and so forth.

The mask data 102 and the process data 104 are preferably used to construct a process model 106. Using the process model 106, different mask data 102 is combined with different process data 104 in a database. A structural model 108 is created from the process model 106, recipe data 107, and model data 109. The recipe data 107 represents user supplied information, such as is entered into a recipe by which the SEM 12 is controlled. The model data 109 contains empirically determined data, such as sample material data from an x-ray microanalysis.

The structural model 108 contains specific information in regard to the sample that indicates the size and the shape that the structure should have, based on the material, mask, and processing that were used to construct the structure. An interaction model 19 is then constructed, based at least in part on the structural model 108. The interaction model 19 contains information in regard to how the measurement tool, preferably the scanning electron microscope 12, will interact with the structure on the sample 16, based on the information from the structural model 108, and is generally referred to as composition data, which includes composition or structural data.

Looking now at calibration sample 14 of FIG. 2, the electron microscope 12 is used to measure the calibration sample 14, and produce calibration data 116, such as by using a method as described above. From the comparison of the actual widths of the measurement sites on the calibration sample 14 and the apparent widths of the measurement sites on the calibration sample 14 as sensed by the electron microscope 12, a SEM optics model 17 is developed, which contains information about how the electron microscope 12 is currently behaving with regard to critical dimension measurement of known samples, and is generally referred to as the calibration factor.

The SEM optics model 17 is used in conjunction with the interaction model 19 to produce a signal image model 126, which preferably is an image of the anticipated signal that the electron microscope 12 will produce when it is used to measure the sample 16, on which the structural model 108 is based. The sample 16 is measured using the SEM 12, and produces measured signal/image data 124, as depicted in FIG. 2. Preferably, the measured signal image 124 that is produced from the actual measurement data is similar in data composition to the signal image model 126 that is produced from data that describes the sample 16 and the electron microscope 12. The measured signal image data 124 is compared to the signal/image model 126 in a calculation routine 128, from which the corrected measurements 130 are produced.

The information in regard to the comparison of the image model 126 and the measured image 124 is feed back to the structural model 108, so as to further tune the calibration system. It is useful to think of this not as a correction factor, but the parameters to be used in determining the properties of the sample from the models and the acquired scan data. In other words, information in regard to how well the image model 126 predicts the actual size of the structure, as compared to the measured image 124, is used to improve the structural model 108 for future measurements.

This is used, for example, in spectroscopic ellipsometers, where curves representing the relative attenuation and phase shift between the p and s polarization component are measured as a function of wavelength. Film thickness, absorption, refractive index, composition are determined by calculating the spectra that would result from a given set of model parameters, and iteratively changing the model parameters to minimize the differences between the measured and model-generated spectra. This generic mathematical technique is known as non-linear optimization or regression, and is preferably accomplished using a Marquardt-Levenburg or similar technique. In the present case, rather than a spectrum, there is a signal or image representing the number of collected electrons versus position along the scan of the sample.

The foregoing description of preferred embodiments for this invention has been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical applications, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A method for determining an actual measurement of a structure on a sample using a measurement tool with a calibration standard having measurement sites, the method comprising the steps of:

measuring a first known metric of a first measurement site on the calibration standard using the measurement tool to produce a first measurement, wherein the first site is a previously measured site, measuring a second known metric of a second newly measured site on the calibration standard using the measurement tool to produce a second measurement, computing a calibration factor for the measurement tool by comparing the first measurement to the first known metric and the second measurement to the second known metric, measuring the structure on the sample using the measurement tool to produce a precursor measurement, and adjusting the precursor measurement with the calibration factor to produce an intermediate measurement.

2. The method of claim 1, further comprising adjusting the intermediate measurement with sample composition data to produce the actual measurement.

3. The method of claim 1, wherein the calibration factor is computed by averaging the difference of the first measurement and the first known metric with the difference of the second measurement and the second known measurement.

4. The method of claim 1, wherein the measurement tool is a scanning electron microscope.

5. The method of claim 1, wherein the first site is used for computing a calibration factor a given number of times, the given number of times being the number of measurements before the measurement tool causes significant changes to composition data of the first site.

6. The method of claim 5, wherein the calibration standard is replaced after each first site on the calibration standard has been measured a given number of times.

7. The method of claim 1, wherein composition data for the first site on the calibration standard is substantially similar to the sample composition data.

8. The method of claim 1, why the sample composition data includes material information and structural information.

9. The method of claim 8, wherein the structural information is automatically determined by imaging the structure.

10. The method of claim 8, wherein the material information is automatically detected using a material analysis technique.

11. The method of claim 10, wherein the material analysis technique is energy dispersive x-ray analysis.

12. The method of claim 1, wherein the calibration standard contains at least about one hundred measurement sites.

13. An apparatus for obtaining an actual measurement of a structure on a sample, the apparatus comprising a measurement tool for obtaining measurement data and at least one replaceable calibration standard built into the measurement tool, the calibration standard containing measurement sites for calibrating the measurement tool.

14. The apparatus of claim 13, wherein the measurement tool is a scanning electron microscope.

15. The apparatus of claim 13, wherein the at least one calibration standard contains at least about one hundred measurement sites.

16. A method for determining an actual measurement of a structure on a sample using a measurement tool, the method comprising the steps of:

selecting a calibration standard having measurement sites with composition data substantially similar to the sample composition data, measuring a first known metric of a first previously measured site on the calibration standard using the measurement tool to produce a first measurement, measuring a second known metric of a second previously measured site on the calibration standard using the measurement tool to produce a second measurement, computing a calibration factor for the measurement tool by comparing the first measurement to the first known metric and the second measurement to the second known metric, wherein the previously measured sites arc used for computing the calibration factor a given number of times, the given number of times being the number of measurements before the measurements cause significant changes to composition data of the previously measured sites, measuring the structure on the sample using the measurement tool to produce a precursor measurement, and adjusting the precursor measurement with the calibration factor to produce an intermediate measurement.

17. The method of claim 16, wherein the measurement tool is a scanning electron microscope.

18. The method of claim 16, further comprising adjusting the intermediate measurement with the sample composition data to produce the actual measurement.

19. The method of claim 16, wherein the calibration standard is replaced after e previously measured site on the calibration standard has been measured a given number of times.

20. The method of claim 16, wherein the sample composition data includes material information and structural information.

21. A method for determining an actual measurement of a first structure on a sample formed of a first material using a measurement tool with a calibration standard having a measurement site formed of a second material, where the measurement site is structurally similar to the first structure and the first material is similar to the second material, the method comprising the steps of:

measuring a first known metric of the measurement site on the calibration standard using the measurement tool to produce a first measurement, computing a calibration factor for the measurement tool by comparing the first measurement to the first known metric, measuring the first structure on the sample using the measurement tool to produce a precursor measurement, and adjust the precursor measurement with the calibration factor to produce the actual measurement.

22. A method for determining an actual measurement of a structure on a sample using a measurement tool with a calibration standard having measurement sites, whew measurement of the measurement sites on the calibration standard by the measurement tool induces a change in properties of the measurement site, the method comprising the steps of:

measuring a first known metric of at least one of the measurement sites on the calibration standard using the measurement tool to produce a first measurement, where the at least one of the measurement sites is only measured a given number of times before being retired from use, computing a calibration factor for the measurement tool by comparing the first measurement to the fast known metric, measuring the structure on e sample using the measurement tool to produce a precursor measurement, and adjusting the precursor measurement with the calibration factor to produce the actual measurement.

23. In an electron microscope having an electron optical system and an incident electron beam for measuring a sample, the improvement comprising a measurement calibration module that models properties of the electron optical system and interaction of the incident electron beam with the sample to produce a calibration, the measurement calibration module adapted to adjust the measurement of the sample based on the calibration.

* * * * *